Patented Apr. 12, 1949

2,467,028

UNITED STATES PATENT OFFICE 2,467,028

NITRO ALKANE SULFONYL CHLORIDES

Marvin H. Gold and Leonard J. Druker, Chicago, Ill., assignors to The Visking Corporation, Chicago, Ill., a corporation of Virginia No Drawing. Application December 24, 1947, Serial No. 793,752

9 Claims. (Cl. 260—543)

This invention relates to new chemical compounds hitherto not described in the literature. More particularly, it relates to nitro alkane sulfonyl chlorides.

Aromatic sulfonyl chlorides and aromatic nitro sulfonyl chlorides have been known for a long time. Similarly, simple aliphatic sulfonyl chlorides have also been described in the literature. However, nitro alkane sulfonyl chlorides and particularly stable nitro alkane sulfonyl chlorides are not at all described and are unknown to the chemical art. This is not surprising since it was believed that alkane sulfonyl chlorides containing a primary or secondary nitro group could be capable only of very transitory existence, and therefore would not be stable chemical entities. The reason for this is that a primary or secondary aliphatic nitro group is capable of enolization and thus it would be expected that the enolized nitro sulfonyl chloride would undergo a sort of intermolecular esterification either with itself or the chlorinating agent.

An object of this invention is to provide a series of new chemical compounds.

Another object of this invention is to provide stable nitro alkane sulfonyl chlorides.

Other and additional objects will become apparent hereinafter.

The objects of the invention are accomplished in general by converting the sulfonic acid salt residue of a salt of nitro alkane sulfonic acid containing a primary sulfonate group to a sulfonyl chloride group by treatment with a reagent such as, for example, phosphorous pentachloride, phosphorous oxychloride and phosphorous trichloride. The resultant reaction mixture is worked up in any convenient manner and the nitro alkane sulfonyl chloride recovered therefrom.

In the preferred embodiment, the nitro alkane sulfonate is suspended in phosphorous oxychloride as a solvent and then an equivalent amount of phosphorous trichloride is added. The phosphorous trichloride is then oxidized to the pentachloride by the addition of dry chlorine gas. When the addition is complete, as shown by collection of the yellow chlorine vapor above the surface of the reaction mixture, the reaction mixture is refluxed for a while longer and then cooled. Then all the solids are removed by filtration and the phosphorous oxychloride and any other easily volatile halides are removed from the filtrate by distillation at reduced pressure, such as 20 m. m. to 200 m. m. of mercury, in order not to overheat the residue. The resulting dark residue is taken up in a solvent; washed thoroughly with water; dried, first with anhydrous sodium sulfate and then with an anhydrous alkali metal carbonate, and finally distilled.

Any nitro alkane sulfonate in which the sulfonate group is a primary group can be employed as one of the reactants. In order to obtain a stable nitro alkane sulfonyl chloride, the sulfonate group must be a primary group. However, the nitro group of the nitro alkane sulfonate can be a primary, secondary, or tertiary group, and such nitro group can be beta, gamma, delta, etc. The precise nature of the other group or groups attached to the secondary or tertiary carbon atom is not important or essential provided such other group or groups are not reactive with the other reagents employed in the process. Thus such other group or groups can be, for example: halogen, such as chlorine; bromine, iodine, etc.; alkyl, such as methyl, ethyl, propyl, butyl, etc.; aryl, such as phenyl, naphthyl, etc.; alkoxy, such as methoxy, ethoxy, etc.; aryloxy, such as phenoxy, naphthyloxy; cyclo alkyl, such as cyclo hexyl, etc.

As previously mentioned, phosphorous trichloride, phosphorous oxychloride, and phosphorous pentachloride constitute another of the reactants. Phosphorous pentachloride is preferred because of its speed of reaction and it can be incorporated as such into the reaction mixtue or it can be produced in situ in the reaction mixture. When phosphorous pentachloride is formed in situ in the reaction mixture, phosphorous trichloride is first incorporated in the reaction mixture and then converted to the pentachloride by the addition of gaseous chlorine. By controlling the addition of dry chlorine gas, the rate of formation of the pentachloride and hence the rate of reaction is controlled.

Any solvent in which the selected nitro alkane sulfonate is soluble and which is not deleteriously affected by the reagents can be used. Phosphorous oxychloride, which incidentally may also constitute one of the reactants, has been found especially suitable for use as a solvent in which the reaction is carried out.

The proportions of the reactants are not critical. In general, the reactants are preferably equi-molar in ratio, but an excess of any of the reagents can be used.

The conditions for carrying out the reaction are not critical. In order to assure the reaction going to completion, refluxing of the reaction mass is continued for an appropriate period of time after chlorine vapor appears above the surface of the reaction mixture.

Any appropriate solvent which dissolves the dark residue remaining after the distillation of the filtrate and does not react therewith can be used. Benzene, ether, chloroform, methylene chloride, carbon tetrachloride, toluene, chlorobenzene, etc., are several illustrative examples of satisfactory solvents which can be used.

The details and manner of practicing the invention will become apparent from the following specific examples, it being understood that these examples are merely illustrative embodiments of the invention and that the scope of the invention is not limited thereto.

Example I

In a reaction vessel equipped with a stirrer, water-cooled reflux condenser, and gas inlet tube were placed 100 g. of ammonium-2-nitrobutane-1-sulfonate, 150 ml. of phosphorous oxychloride, and 75 g. of phosphorous trichloride. Chlorine gas was introduced into the mixture, and the exothermic reaction caused refluxing. After one hour, chlorine appeared in the condenser, and the flow of chlorine was then shut off. The mixture was refluxed with stirring for an additional hour, and finally cooled to room temperatures. The solid material was removed by filtration, and the filtrate was distilled under slightly reduced pressures until the phosphorous oxychloride was removed. The crude residue was dissolved in benzene, and this solution washed three times with water. The benzene solution was dried over anhydrous sodium sulfate, and then treated with anhydrous potassium carbonate. The benzene was removed by distillation, and further distillation yielded 64 g. of the 2-nitrobutane-1-sulfonyl chloride. B. P. 105–110° C. at 2 mm. M. P. 9–11° C. Index of refraction: 1.4800 at 24° C. Specific gravity: 1.418 at 24° C.

Example II

In a reaction vessel were placed 220 g. of potassium-2-nitrobutane-1-sulfonate and 300 ml. of phosphorous oxychloride. Then 225 g. of phosphorous pentachloride was added slowly with stirring. A rapid exothermic reaction occurred causing the phosphorous oxychloride to reflux vigorously. Refluxing of the reaction mixture was continued for one hour. After the mixture was cooled, the solid product was removed by filtration through a sintered glass funnel. The filtrate was distilled under slightly reduced pressures until 200 ml. of the phosphorous oxychloride was removed. The remaining dark solution was added to ice water, and this mixture was extracted with ether. The ether solution was dried over anhydrous sodium sulfate, and then the ether was removed by distillation. The desired 2-nitrobutane-1-sulfonyl chloride distilled at 105–106° C. at 2 mm.

Example III

A mixture of 200 ml. of phosphorous oxychloride and 120 g. of potassium-2-nitrobutane-1-sulfonate was placed in a reaction vessel equipped with a stirrer and water-cooled reflux condenser. This mixture was refluxed with stirring for seven hours. After cooling, the solid material was separated by filtration and the filtrate was distilled under reduced pressures in order to remove the phosphorous oxychloride. The dark oil was dissolved in benzene and then washed three times with water and finally dried over anhydrous sodium sulfate. The benzene was removed by distillation and 2-nitrobutane-1-sulfonyl chloride was obtained by further distillation.

Example IV

In a reaction vessel equipped with a stirrer, gas inlet tube, and water-cooled reflux condenser were placed 262 g. of potassium-2-nitro-2-chlorobutane-1-sulfonate, 350 ml. of phosphorous oxychloride, and 137 g. of phosphorous trichloride. Chlorine gas was introduced into the reaction and the exothermic reaction caused refluxing. After two hours chlorine appeared in the condenser, and the flow of chlorine was shut off. The mixture was then refluxed for three hours, and finally cooled to room temperatures. The solid material was separated by filtration and the filtrate was distilled under slightly reduced pressures until the phosphorous oxychloride was removed. This residue was dissolved in benzene and then washed three times with water, and finally dried over anhydrous sodium sulfate. The dried benzene solution was then treated with anhydrous potassium carbonate. The benzene was removed by distillation, and further distillation yielded the product, 2-nitro-2-chlorobutane-1-sulfonyl chloride. B. P. 108–109° C. at 1 mm. Index of refraction: 1.4955 at 24° C. Specific gravity: 1.511 at 24° C.

Example V

A mixture of 215 g. of potassium-2-bromo-2-nitrobutane-1-sulfonate, 350 ml. of phosphorous oxychloride, and 100 g. of phosphorous trichloride were placed in a reaction vessel. Chlorine gas was introduced for two hours and then the reaction mixture was refluxed with stirring for three additional hours. The solid material was removed by filtration, and the filtrate was distilled in order to remove the phosphorous oxychloride. The dark oil was dissolved in benzene, and this solution was washed three times with water. The benzene solution was dried over anhydrous sodium sulfate, treated with potassium carbonate, and finally distilled. Further distillation yielded 2-bromo-2-nitrobutane-1-sulfonyl chloride. B. P. 120–125° C. at 2 mm., M. P. 24–25° C. Index of refraction: 1.5157 at 27° C. Specific gravity: 1.744 at 27° C.

Example VI

A mixture of 230 g. of potassium-2-nitropropane-1-sulfonate, 300 ml. of phosphorous oxychloride, and 137 g. of phosphorous trichloride were placed in a reaction vessel. Chlorine gas was introduced for two hours and then the reaction mixture was refluxed for eight hours. After filtering the mixture through a sintered glass funnel, the filtrate was distilled under slightly reduced pressures until the phosphorous oxychloride was removed. The solid material from the filtration was added to a large volume of cold water, and the dark oil was extracted with benzene. This benzene solution was used to dissolve the residue left from the distillation, and then washed four times with water. This solution was dried over anhydrous sodium sulfate and finally treated with anhydrous potassium carbonate. The benzene was removed by distillation after which the product, 2-nitropropane-1-sulfonyl chloride, was obtained. B. P. 105–106° C. at 3 mm., M. P. 5–6° C. Index of refraction: 1.4840 at 24° C. Specific gravity: 1.502 at 24° C.

Example VII

In a reaction vessel equipped with a stirrer, water-cooled reflux condenser, and gas inlet tube were placed 60 g. of potassium-2-nitroethane-1-sulfonate, 120 ml. of phosphorous oxychloride and 27 ml. of phosphorous trichloride. Chlorine gas was introduced for forty-five minutes and the mixture was refluxed for two additional hours. The reaction mixture was then added slowly with stirring to a large volume of ice water. The crude oil was extracted with benzene, and this solution was dried over anhydrous sodium sulfate. After treating this solution with anhydrous potassium carbonate, the benzene was removed by distillation. The 2-nitroethane-1-sulfonyl chloride was obtained by further distillation of the residue. B. P. 120–125° C. at 2 mm., M. P. 9–10° C. Index of refraction: 1.4980 at 24° C. Specific gravity: 1.618 at 24° C.

In general, the nitro alkane sulfonyl chlorides of this invention correspond to the nitro alkane sulfonate from which they are prepared. Essentially, the nitro alkane sulfonyl chlorides of this invention contain a primary sulfonyl chloride group, and a primary, secondary or tertiary nitro group. Though, as shown by the examples, beta nitro alkane sulfonyl chlorides containing a primary sulfonyl chloride group and also a primary, secondary or tertiary nitro group constitute the preferred embodiment of the invention, it is to be understood that the nitro group need not be beta, but can be gamma, delta, etc.

The nitro alkane sulfonyl chlorides of this invention are capable of wide utility. They are applicable to the preparation of new pharmaceuticals such as those related to the sulfonamides. They also can be used to make plasticizers and will be of great value in the study of a number of biochemical processes.

Since it is obvious that various changes and modifications may be made in the above description, without departing from the nature or spirit thereof, this invention is not restricted thereo except as set forth in the appended claims.

We claim:
1. Stable nitro alkane sulfonyl chlorides having a primary sulfonyl chloride group and a nitro group selected from the class which consists of primary, secondary and tertiary nitro groups.
2. Stable nitro alkane sulfonyl chlorides having a primary sulfonyl chloride group and a primary nitro group.
3. Stable nitro alkane sulfonyl chlorides having a primary sulfonyl chloride group and a secondary nitro group.
4. Beta nitro alkane sulfonyl chlorides having a primary sulfonyl chloride group.
5. Beta nitro alkane sulfonyl chlorides having a primary sulfonyl chloride group and a primary nitro group.
6. Beta nitro alkane sulfonyl chlorides having a primary sulfonyl chloride group and a secondary nitro group.
7. 2-nitrobutane-1-sulfonyl chloride.
8. 2-nitropropane-1-sulfonyl chloride.
9. 2-nitro-2-chlorobutane-1-sulfonyl chloride.

MARVIN H. GOLD.
LEONARD J. DRUKER.

No references cited.